Aug. 3, 1954  D. L. HAMMOND ET AL  2,685,422
VARIABLE STOP MECHANISM FOR INTERRELATED MECHANICAL
SURFACE CONTROL SYSTEMS FOR AIRCRAFT
Filed Dec. 27, 1951  4 Sheets-Sheet 1
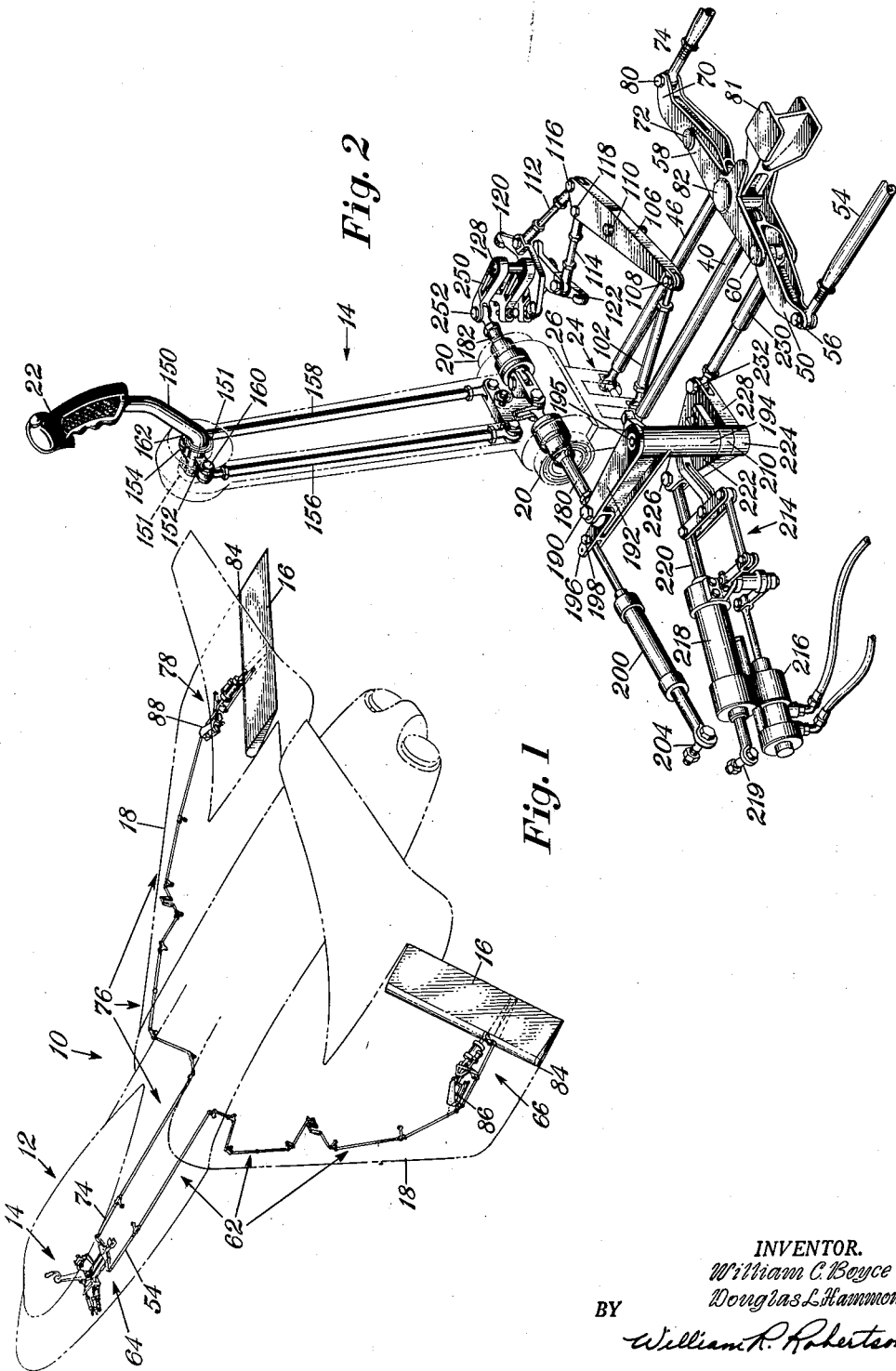
INVENTOR.
William C. Boyce
Douglas L. Hammond
BY
William R. Robertson
Agent INVENTOR.
William C. Boyce
Douglas L. Hammond
BY
William R. Robertson
Agent Aug. 3, 1954   D. L. HAMMOND ET AL   2,685,422
VARIABLE STOP MECHANISM FOR INTERRELATED MECHANICAL
SURFACE CONTROL SYSTEMS FOR AIRCRAFT
Filed Dec. 27, 1951   4 Sheets-Sheet 4
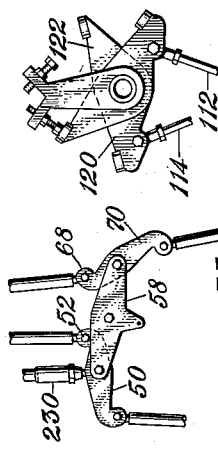
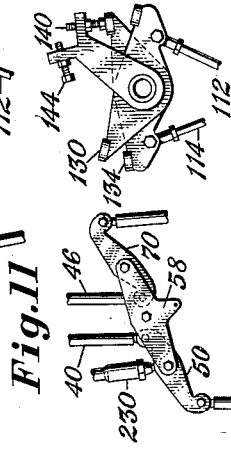
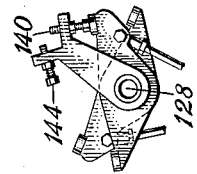
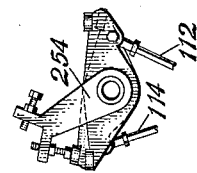
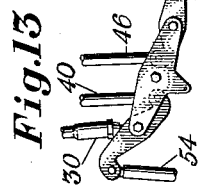
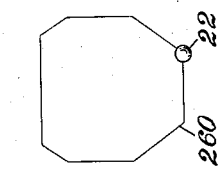
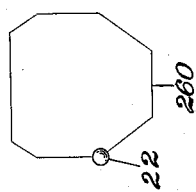
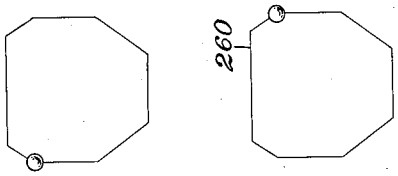
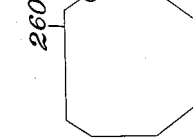
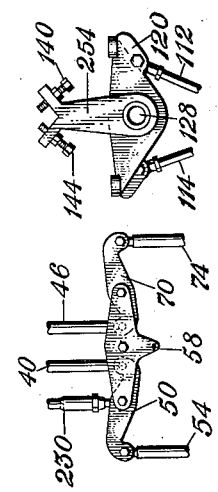
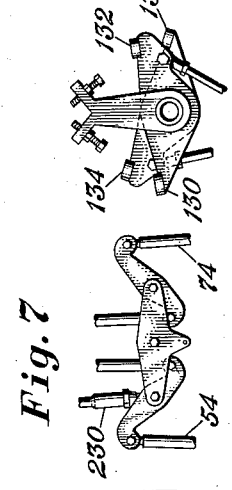
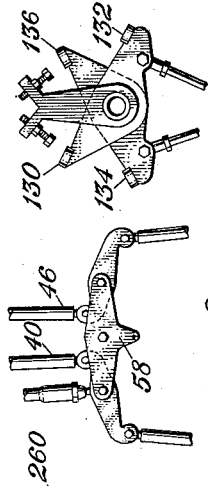
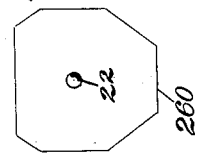
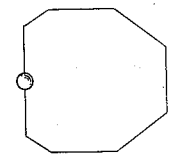
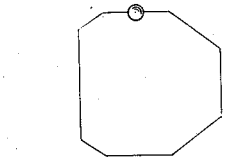
INVENTOR.
William C. Boyce
Douglas L. Hammond
BY
William R. Robertson
Agent Patented Aug. 3, 1954

2,685,422

UNITED STATES PATENT OFFICE 2,685,422

VARIABLE STOP MECHANISM FOR INTERRELATED MECHANICAL SURFACE CONTROL SYSTEMS FOR AIRCRAFT

Douglas L. Hammond and William C. Boyce, Dallas, Tex., assignors, by mesne assignments, to Chance Vought Aircraft, Incorporated, a corporation of Delaware Application December 27, 1951, Serial No. 263,588

6 Claims. (Cl. 244—83)

This invention relates to aircraft and more particularly to a variable stop system for controlling aircraft.

While this mechanism may be used on conventional type airplanes with minor changes from the preferred embodiment herein shown and described, it is particularly well adapted for use on airplanes having ailavators, a term applied to aircraft control surfaces having the combined functions of ailerons and elevators, and its primary purpose is to provide adjustable stops in the linkage between the pilot's control member and the ailavator in order that the permissible angle of movement of the ailavator may not be exceeded.

Heretofore, non-adjustable stick limits have been used which consisted generally of an octagonal box of metal plate whose sides circumscribed the pilot's control member and prevented its movement beyond predetermined points. The construction of this box because of required close tolerances necessitated hand filing. The only method of making an adjustment of the limit stops was to construct a new box of different dimensions, a method that was costly, time consuming and requiring considerable metal working and welding equipment. In addition, when the stick followed around the limits set by the box, distinct roughness and vibrations were experienced by the pilot, said vibrations and roughness causing added distraction and fatigue to the pilot.

This invention has for an object a control mechanism for ailavators which will permit the ailavators to pivot through prescribed angles.

Another object of this invention is to provide an ailavator control mechanism which has ailavator motion limit stops which are easily and readily adjustable.

Yet another object of this invention is to provide an ailavator control mechanism in which the elevator function of the ailavator system will override the aileron function of the said system.

A still further object of this invention is to provide an ailavator control mechanism which is easily and smoothly operated by the pilot without roughness or vibrations.

Briefly, this invention consists of a special linkage system including interconnected rods, bellcranks, lever arms and limiting members combined with the pilot operated control member, the movable airplane control surfaces which have the combined functions of elevator and aileron, the hydraulic power boost actuator to move the surfaces, feel means for the elevator function, and feel means for the aileron function. The linkage is so arranged with its limit stops that movement of the pilot control member for combined elevator-aileron effect or for either of them separately will not permit the ailavator to pivot beyond safe aerodynamically and structurally determined angles.

Other objects and advantages will be apparent from the specification and claims, and from the accompanying drawings which illustrate an embodiment of the invention.

In the drawings:

Fig. 1 is a perspective view of an airplane having ailavators shown in phantom with the control and actuating mechanism of this invention shown in full lines connecting the pilot's control stick with the ailavators;

Fig. 2 is an enlarged perspective view of the pilot's control member, connecting and mixing linkage, limit stops, and related mechanism of this invention, the aft mechanism to the ailavators being omitted and the pilot's control stick housing being shown in phantom lines;

Figures 3, 3A:
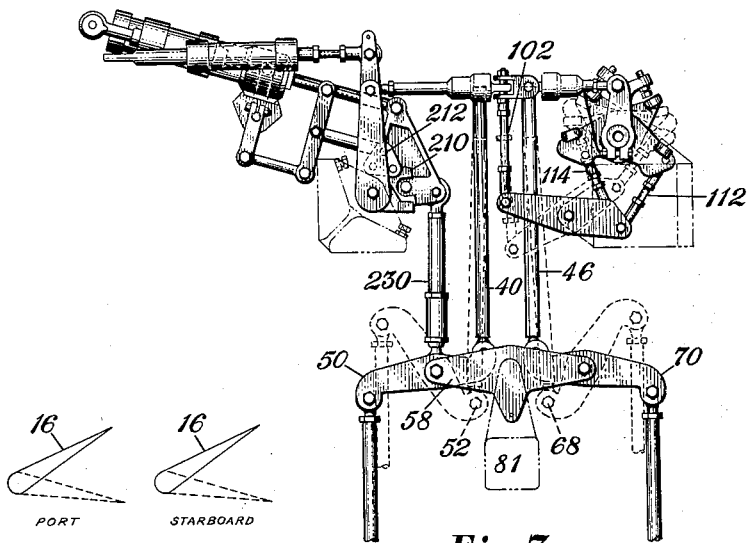
Figures 4, 4A:
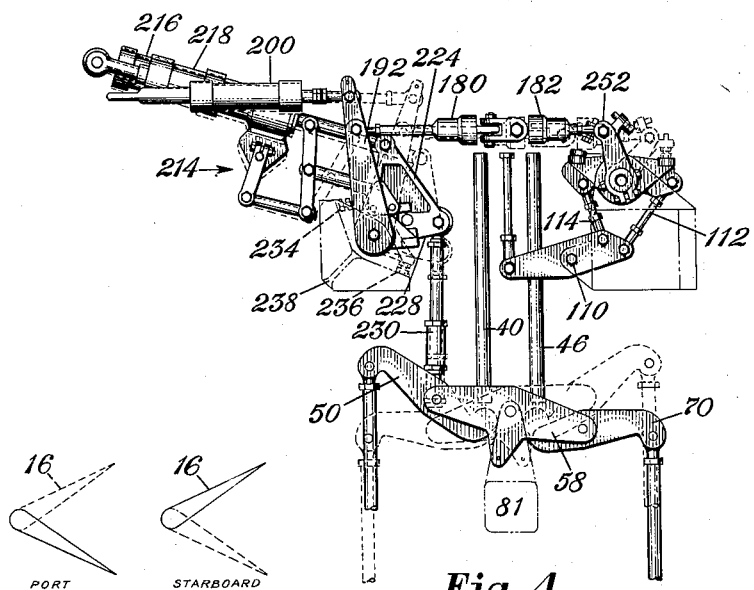
Figure 5:
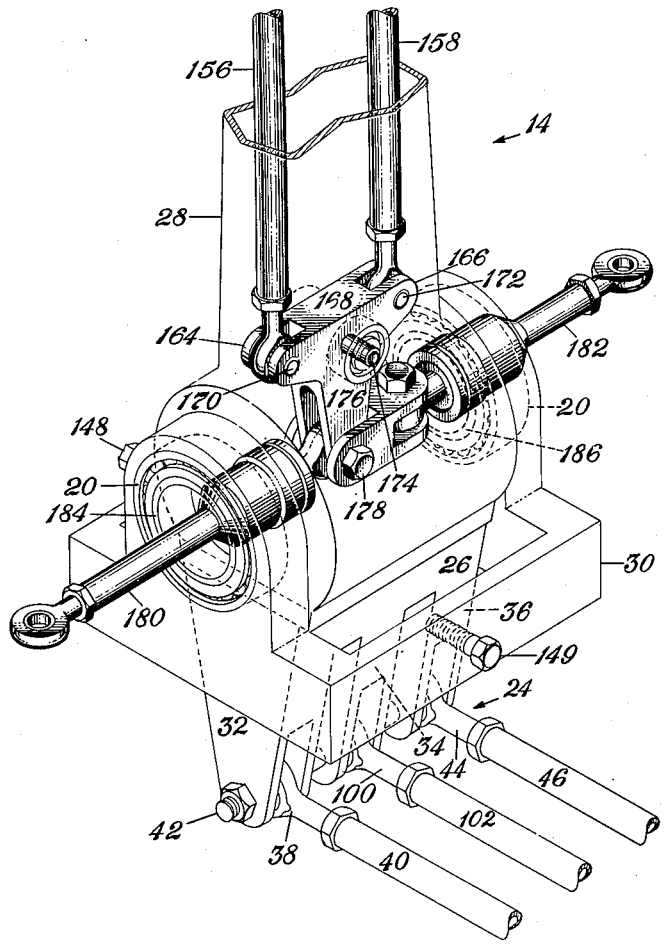
Figure 6:
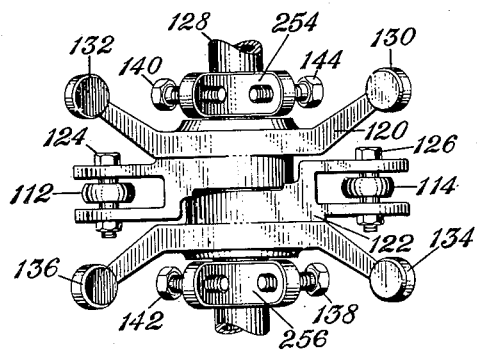

Fig. 3 is a top plan view of the mechanism depicted in Fig. 2 with the pilot control stick omitted for clarity only, the linkage system being shown in this view in a position that demands no aileron function of the ailavators, the full lines depicting the linkage positions to demand a full up elevator function of the ailavator surfaces, and the dotted lines depicting the position of the linkage when a full down elevator function of the ailavator surfaces is demanded by the pilot control member;

Fig. 3A is a schematic representation of the positions of the starboard and port ailavators under the conditions shown in Fig. 3 with full up elevator in full lines and full down elevator in dotted lines;

Fig. 4 is a top plan view similar to Fig. 3 but with the linkage shown in a position where no elevator function of the ailavator surfaces is demanded by the pilot control member, the solid lines indicating the linkage position where the pilot member demands a starboard roll, i. e., with the port ailavator deflected downwardly and starboard ailavator deflected upwardly, and the dotted lines indicating the linkage position when a port roll is demanded by the pilot's control member;

Fig. 4A is a schematic representation similar to Fig. 3A showing the position of the ailavators under the conditions shown in Fig. 4 with the starboard roll setting in full lines and port roll setting in dotted lines;

Fig. 5 is an enlarged perspective view of the lower portion of the pilot control member and attached linkage with parts thereof broken away and the control member housing shown in phantom;

Fig. 6 is an enlarged front view of the scissor stop mechanism of this invention depicted in a neutral position;

Fig. 7 is a schematic representation of the control member within its limit pattern, the mixing linkage, and the scissor stop mechanism of this invention when the position of the pilot's control member demands that both ailerons be in neutral;

Fig. 8 is a schematic representation similar to Fig. 7 but with the pilot's control member positioned so as to demand full elevator down, i. e., both ailavators deflected 10 degrees down from neutral;

Fig. 9 is a schematic representation similar to Fig. 8 but with the pilot's control member positioned so as to demand full elevator up, i. e., both ailavators deflected 30 degrees up from neutral;

Fig. 10 is a schematic representation similar to Fig. 9 but with the pilot's control member positioned so as to demand 30 degrees starboard ailavator up and 30 degrees port ailavator down;

Fig. 11 is a schematic representation similar to Fig. 10 but with the pilot's control member positioned so as to demand 45 degrees starboard ailavator up and 15 degrees port ailavator up;

Fig. 12 is a schematic representation similar to Fig. 11 but with the pilot's control member positioned so as to demand 15 degrees starboard ailavator down and 45 degrees port ailavator up;

Fig. 13 is a schematic representation similar to Fig. 12 but with the pilot's control member positioned so as to demand 35 degrees starboard ailavator down and 25 degrees port ailavator up; and Fig. 14 is a schematic representation similar to Fig. 13 but with the pilot's control member positioned so as to demand 25 degrees starboard ailavator up and 35 degrees port ailavator down.

In Fig. 1 is shown an airplane 10 having a cockpit 12 and pilot control member 14 for moving ailavators 16 hingedly secured in the aft or trailing edges of each outboard wing section 18. The ailavator and its control mechanism combines and performs the functions of two conventional primary surface control systems, i. e., that of the elevator and that of the aileron.

Referring now to Fig. 2, pure elevator control, i. e., both ailavator surfaces being deflected upwardly or downwardly simultaneously, is exercised by the pilot's pulling back or pushing forward on control member 14 which, for elevator control, pivots about the axes of bearing 20 providing for a lever arm extending from the control member handle grip 22 through the axes of bearings 20 to the linkage connecting points at the tip 24 of the control member extension 26 of the control member 14 which depends below the bearings 20 which are fixedly secured in fixed aircraft structure 30 and in which housing 28 is rotatably movable (Fig. 5). In demanding elevator action only of the ailavator surfaces, the pilot pulls or pushes the control member 14 by exerting pressure in a forward or aft direction on hand grip 22 of member 14 and the force which he exerts multiplied by the lever arm 22—24 is relayed to the linkage connected to extension 26 at its tip 24 by control member housing 28. Extension 26 has three depending ears or furcations 32, 34 and 36, each of which is bifurcated. The universal type end 38 of a connecting rod 40 is pivotally secured between the bifurcations of the port ear 32 of extension 26 by a bolt 42 which extends through furcations 32, 34 and 36. In the same manner the universal type end 44 of a rod 46 is secured by the bolt 42 between the bifurcations of the starboard ear 36 of extension 26. Rod 40 extends aft from bolt 42 and has its other end pivotally secured to the inboard end of a rocker arm 50 by a pin 52. Rocker arm 50 has a connecting rod 54 pivotally secured to its outboard end by a pin 56 and is rotatably secured at its midportion to the port end of a walking beam 58 by a pin 60. Rod 54 is part of the connecting linkage 62 between the mixing linkage which is generally indicated by the numeral 64 and of which arm 50 and beam 58 are a part, and the fluid pressure servomotor system 66 of the port ailavator 16. Similarly, rod 46 is pivotally connected by pin 68 to the inboard end of rocker arm 70 which is rotatably connected by pin 72 to the starboard end of beam 58. Likewise, a rod 74 connected through linkage 76 to the starboard ailavator fluid pressure servomotor system 78 is secured to the outboard end of arm 70 by pin 80. Walking beam 58 is rotatably secured at its midportion to fixed aircraft structure 81 by pin 82. It is thus seen that the force relayed to extension 26 by the pilot's forward push on grip 22 is carried through rods 40 and 46 to arms 50 and 70 causing arm 50 to turn clockwise (Fig. 3) and arm 70 to turn counterclockwise. Beam 58 will not move. This movement of arms 50 and 70 causes rods 54 and 74 to move forward a distance proportional to the displacement of the pilot's control member. The movement to rods 54 and 74 relayed through the connecting linkage 62 and 76 respectively to servomotor system 66 and 78 respectively activate systems 66 and 78 causing them to deflect ailavators 16 downwardly about their hinges 84 putting the airplane in a diving attitude. The pilot by pulling back on control member 14 will cause movement in the above described mechanism opposite to that above set out and will cause the airplane to assume a climbing attitude.

The universal type rod ends referred to herein may be of any conventional type which permits limited universal movement. Their use is clearly advisable as shown by the dotted lines of rods 40 and 46 in Fig. 3 wherein it is seen that rods 40 and 46, in addition to their forward and aft motion, must pivot slightly outboard and inboard because of the rotation of arms 50 and 70.

Within hydraulic servomotor systems 66 and 78 are fluid feel systems 86 and 88 respectively connected to the linkages 62 and 76 respectively which cause a force generally proportional to the aerodynamic forces on the ailavator to be relayed back through the above described linkage to the pilot's control member and to act contrary to the forces exerted by the pilot on the control member 14. The construction and detail arrangement of servomotors 66 and 78 and the fluid "feel" systems 86 and 88 are not considered a part of the present invention.

Universal type end 100 of a connecting rod 102 is pivotally secured between the bifurcations of the middle ear 34 of extension 26 by bolt 42 and extends aft to a point where its other end is pivotally secured to one arm of bellcrank 106 by a pin 108. Bellcrank 106 is rotatably secured at its midportion by pin 110 to fixed aircraft structure and is pivotally secured at its end opposed to pin 108 to one end each of rods 112 and 114 by pins 116 and 118 respectively. The other ends of rods 112 and 114 are pivotally secured to scissor stop members 120 and 122 respectively by pins 124 and 126. Members 120 and 122 are rotatably secured at their midportions on a shaft 128 rotatably secured to fixed aircraft structure. Two upwardly directed flanges one on each end of member 120 terminate in stop pads 130 and 132 respectively while two downwardly directed flanges one on each end of member 122 terminate in stop pads 134 and 136 respectively. When rod 102 is moved forward, that motion is relayed through bellcrank 106 and rods 112 and 114 causing the stop pads 130 and 136 of members 120 and 122, respectively, to move forward. Movement of rod 102 aft causes stops 132 and 134 to move forward.

In order to have the ailavators impart aileron motion, the pilot, gripping handle grip 22, causes member handle extension 150 to rotate within bearings 151 in housing 28 about member 14 to starboard or port. Member extension 150, on which grip 22 is mounted, has bifurcated arms 152 and 154 integral therewith extending on its port and starboard sides respectively within housing 28. Tie rods 156 and 158 are rotatably secured to the bifurcated arms 152 and 154 respectively by pins 160 and 162 and extend downwardly where they are rotatably connected at their lower extremities to each of two bifurcated arms 164 and 166 respectively of a bellcrank 168 by pins 170 and 172 respectively. Bellcrank 168 is rotatably secured by a shaft 174 within stick housing 28 and has a third bifurcated arm 176 depending from it which is rotatably secured by a pin 178 to universal type rods 180 and 182. Rods 180 and 182 extend outboard to port and starboard respectively through hubs 184 and 186 of housing 28 located within the bearings 29. It is thus seen that as the pilot moves the control member grip 22 to starboard causing handle extension 150 to rotate in housing 28, the rod 156 is pulled up and rod 158 is pushed down causing bellcrank 168 to push and pull rods 180 and 182 respectively to port through hubs 184 and 186 respectively. Likewise, when grip 22 is moved to port, rods 180 and 182 are caused to move to starboard.

Rod 180 is pivotally connected at its outboard end by a pin 190 to one arm 192 of a bellcrank 194. Bellcrank 194 pivots on shaft 195 which is secured to aircraft structure. To an extension 196 of arm 192 is pivotally secured by pin 198 the end of a spring centering strut 200, the other end of which is secured by pin 204 to aircraft structure. A lower arm 210 of bellcrank 194 is pivotally connected by pin 212 to linkage 214 while linkage 214 is pivotally connected to a pilot valve 216. Slight movement of bellcrank 194 causes valve 216 to admit hydraulic fluid under pressure to the proper port of a fluid pressure strut 218 which is connected at its outboard end by pin 219 to aircraft structure. Movement of piston rod 220 of strut 218 which is pivotally connected to arm 222 of bellcrank 224 by pin 226 causes bell crank 224 to pivot freely about shaft 195. This causes another arm 228 of bellcrank 224 to move and in turn causes rod 230 to move, rod 230 being pivotally connected at one of its ends to arm 228 by pin 232 and pivotally connected at its other universal type end to the port end of walking beam 58 by pin 60. Movement of pin 60, it is easily seen, causes walking beam 58 to rotate about shaft 82 moving rods 54 and 74 differentially. It is easily seen that when handle grip extension 150 is rotated to starboard causing shaft 180 to move to port (solid lines Fig. 4), strut 218 will be actuated and its force relayed through all the interconnecting linkage to the ailavators 16 causing the port ailavator to rotate downwardly and the starboard ailavator to rotate upwardly thereby causing the airplane to go into a starboard roll. Likewise, rotation of extension 150 to port (dotted lines Fig. 4) will cause the airplane to roll to port.

Rod 182 is pivotally connected at its outboard end to one end of a lever arm 250 by a pin 252. Arm 250 is rigidly secured at its other end to shaft 128. It is therefore seen that as rod 182 moves to starboard or port, shaft 128 will be caused to rotate. As has been heretofore disclosed, members 120 and 122 are rotatably secured to shaft 128. Rigidly secured to shaft 128 above member 120 is one end of an arm 254 and likewise below member 122 is rigidly secured one end of a similar arm 256. Arms 250, 254, and 256 are all generally parallel and extend horizontally generally forward from shaft 128. The free ends of arms 254 and 256 have outwardly extending divergent flanges. Within threaded holes in the flanges on the starboard and port sides of arm 254 are set screws 140 and 144, respectively. Likewise, the flanges of arm 256 carry set screws 142 and 138. Since arms 254 and 256 are rigidly secured to shaft 128, as rod 182 moves arms 254 and 256 are caused to rotate in the same direction as rod 182 moves.

It is thus seen that in moving the control member to provide a combined elevator and aileron effect of the ailavators, members 120 and 122 will be caused to scissor and arms 254 and 256 will be caused to rotate about shaft 128. By adjusting set screws 138, 140, 142 and 144 the rotational distance through which the system and thus ailavators 16 will be movable can be limited. When the stops contact the set screws, further movement of the control member forward or aft will cause a greater amount of elevator movement of the ailavators and less aileron movement inasmuch as the lever arm 22—36 is much longer than the lever arm 22—150 and the resulting greater force relayed through the connecting linkage will result in members 120 and 122 tending to center arms 254 and 256. The critical ailavator rotational angle is thereby prevented from being exceeded at the expense of aileron movement.

Fig. 7, as previously disclosed, shows the limit of movement pattern 260 of the pilot's control member with the member in a neutral position and the corresponding positions of the mixing linkage 64 and the scissor stop mechanism. In Figs. 8 and 9 it will be noted, the scissor pads 130, 132, 134, 136 do not contact the set screws 138, 140, 142, 144 although the control member is shown along its limit pattern 260 in positions calling for full elevator down and full elevator up respectively. When pure elevator motion is demanded, either the forward side of extension 26 contacts limit stop set screw 148 or the aft side of 26 contacts screw 149. Screws 148 and 149 (Fig. 5) are threaded into fixed structure 30 on the fore and aft sides respectively of extension 26. Similarly, as in Fig. 10 where pure full aileron motion is required, arm 222 of bellcrank 224 will contact set screw 234 and where opposite full aileron is required arm 228 will contact set screw 236 (Fig. 4). Set screws 234 and 236 are threaded into fixed aircraft structure 238 at appropriate points. It is thus seen that for either pure elevator or pure aileron motion, the control mechanism is limited by screws 148, 149 or 234, 236 respectively, but for any combination of elevator and aileron motion, the scissor stop mechanism acts as limit stops as illustrated for various combinations in Figs. 11 through 14. For example, in Fig. 12, where the pilot's control member is positioned so as to demand 15 degrees starboard ailavator down and 45 degrees port ailavator up, it will be recalled from previous description, rod 182 will have been caused to move to starboard causing arms 254 and 256 to rotate to starboard. At the same time rods 40, 46 and 102 will be caused to move forward thereby rotating bellcrank 106 causing rods 112 and 114 and hence stop pads 132 and 134 to move aft. This movement causes stop pads 130 and 136 to move forward bringing pad 136 into contact with set screw 142 on member 256. The pilot, with the linkage in this position, could obtain greater elevator effect only by loosing aileron effect for, as he pulls back further on his control member, the scissor stop mechanism causes the handle grip 22 to follow along the pattern 260 indicated bringing both the grip 22 and the ailavators 16 toward a neutral aileron position. Similarly, as less elevator effect is demanded, the scissor stop mechanism will permit greater aileron effect.

The dimensions and geometry of pattern 260 can of course be altered and will be governed by the aerodynamic and structural qualities of the particular aircraft in which this invention is used. This is readily accomplished by screw thread adjustment of some or all of the screws 148, 149, 234, 236, 138, 140, 142, and 144 whereby the requsite pattern for the particular airplane may be attained.

It is thus seen that a mechanism has been provided which will permit the ailavators to pivot through prescribed angles, the elevator function of the ailavator system overriding the aileron function, and the limits thereof being readily adjustable, said mechanism being smoothly and easily operable by the pilot.

It is obvious that this invention could equally as well be applied to systems controlling surfaces having the combined functions of aileron and rudder or rudder and elevator as it is to ailavators, only a rearrangement of the linkages or modification of the construction of the various components being necessary.

While only one embodiment of the invention has been shown in the accompanying drawings, it will be evident that various modifications are possible in the arrangement and construction of the various components of the mechanism without departing from the scope of the invention.

What it is desired to secure by Letters Patent is:

1. In an aircraft having ailavators, a first control system for imparting to said ailavators elevator motion and having adjustable limit stops, a second control system for imparting to said ailavators aileron motion and having adjustable limit stops, linkage means operatively connected to and joining said first control system and said second control system for varyingly combining the motions of said first and second control systems, and adjustable stop mechanism for limiting the movement of said ailavators when the motions of said first and second control systems are combined including a pair of crossed arm members each having a stop pad on each of its ends and having a common pivotal connection to said aircraft at their midportions, an operative connection between said first control system and each of said arm members for pivoting the same in response to movement of said first control system thereby varying the position of said stop pads, and an abutment member connected to said second control member and adapted to contact any one of said stop pads in response to movement of said second control system.

2. In an aircraft having control surfaces, a control system for operating said control surfaces including a control member journaled on said aircraft for forward and aft movement and having a neutral position, a control handle operatively connected to said control member for pivotal movement in a plane perpendicular to the plane of movement of said control member, a first operative connection between said control member and said surfaces, a second operative connection between said control handle and said surfaces, and limit stop mechanism operatively connected to said first and second operative connections for varyingly limiting combined movement of said control member and said control handle and hence said control surfaces including a pair of arm members each having a stop pad on each of its ends and having a common pivotal connection with said aircraft intermediate said ends, an operative connection between said first operative connection and each of said arm members for pivoting the same in response to forward and aft movement of said control member thereby varying the position of said stop pads in relation to the position of said control member in its forward and aft path of travel, and abutment means associated with said second operative connection and adapted to contact one of said stop pads in response to pivotal movement of said control handle when said control member is moved out of its neutral position.

3. In an aircraft having control surfaces, a control system for operating said control surfaces including a control member journaled on said aircraft for forward and aft movement from a neutral position and having an extension depending below said journal, a control handle journaled in said control member for transverse motion, a rod transverse to said control member, an operative connection between said handle and said rod whereby said rod is moved transversely to the fore and aft movement of said control member when said handle is moved relative to said control member, operative connecting linkage between said control member extension and said control surfaces for pivotally moving the same, an operative connection between said rod and said operative connecting linkage, and stop mechanism for limiting the transverse movement of said handle in various positions of fore and aft movement of said member including an arm member pivoted to said aircraft intermediate its ends and having a stop pad on each of its ends, an operative connection between said extension and said arm member for pivoting the same in response to fore and aft movement of said control member thereby varying the position of said stop pads in relation to the position of said control member in its fore and aft path of travel, and an abutment arm connected to said transverse rod adapted to contact said stop pads during transverse movement of said control handle when said control member is moved out of its neutral position.

4. In an aircraft having control surfaces, a control system for operating said control surfaces including a control member journaled on said aircraft for forward and aft movement from a neutral position and having a dependent extension below said journal, a control handle journaled in said control member for transverse motion, a rod transverse to said control member, an operative connection between said handle and said rod whereby said rod is moved when said handle is moved relative to said control member, operative connecting linkage between said control member extension and said control surfaces for moving the same, an operative connection between said rod and said operative connecting linkage, limit means on said aircraft in the path of movement of said dependent extension to limit the fore and aft movement of said control member, abutment means on said aircraft associated with said operative connection between said rod and said operative connecting linkage to limit the transverse movement of said control handle, and separate stop mechanism for varyingly limiting the transverse movement of said control handle in various positions of fore and aft movement of said control member including a pair of arm members having a common pivotal connection at their mid-portions to said aircraft and having a stop pad on each end of each arm member, an operative connection between said extension and each of said arm members for pivotally moving the same when said control member is moved for changing the position of said stop pads in response to fore and aft movement of said control member, and a stop member connected to said transverse rod and adapted to contact said pads on said arm members whereby transverse movement of said handle will be varyingly limited by said stop member contacting one of the said stop pads when said control member is moved out of its neutral position.

5. In an aircraft having control surfaces, a control system for operating said control surfaces including a control member journaled on said aircraft for forward and aft movement from a neutral position and having an extension depending below said journal, a control handle journaled in said control member for transverse motion, a rod transverse to said control member, an operative connection between said handle and said rod whereby said rod is moved transversely to the fore and aft movement of said control member when said handle is moved relative to said control member, operative connecting linkage between said control member extension and said control surfaces for pivotally moving the same, an operative connection between said rod and said operative connecting linkage, and stop mechanism for limiting the transverse movement of said handle in various positions of fore and aft movement of said member including a pair of arm members each having a stop pad on each of its ends and having a common pivotal connection with said aircraft intermediate their ends, an operative connection between said extension and said arm members for pivoting the same in response to fore and aft movement of said control member thereby varying the position of said stop pads in relation to the position of said control member in the fore and aft path of travel, and an abutment arm connected to said transverse rod adapted to contact said stop pads during transverse movement of said control handle when said control member is moved out of its neutral position.

6. In an aircraft having control surfaces, a control system for operating said control surfaces including a control member journaled on said aircraft for forward and aft movement from a neutral position and having a dependent extension below said journal, a control handle journaled in said control member for transverse motion, a rod transverse to said control member, an operative connection between said handle and said rod whereby said rod is moved when said handle is moved relative to said control member, operative connecting linkage between said control member extension and said control surfaces for moving the same, an operative connection between said rod and said operative connecting linkage, and stop mechanism for varyingly limiting the transverse movement of said control handle in various positions of fore and aft movement of said control member including a pair of arm members having a common pivotal connection at their mid-portions to said aircraft and having a stop pad on each end of each arm member, an operative connection between said extension and each of said arm members for pivotally moving the same when said control member is moved for changing the position of said stop pads in response to fore and aft movement of said control member, and a stop member connected to said transverse rod and adapted to contact said pads on said arm members whereby transverse movement of said handle will be varyingly limited by said stop member contacting one of the said stop pads when said control member is moved out of its neutral position.

References Cited in the file of this patent

UNITED STATES PATENTS

| Number | Name | Date |
| --- | --- | --- |
| 1,848,037 | Weick | Mar. 1, 1932 |
| 2,424,889 | Holmes | July 29, 1947 |
| 2,455,584 | Jamison | Dec. 7, 1948 |

FOREIGN PATENTS

| Number | Country | Date |
| --- | --- | --- |
| 463,649 | France | Feb. 27, 1914 |